(12) United States Patent
Hillier

(10) Patent No.: US 6,672,237 B2
(45) Date of Patent: Jan. 6, 2004

(54) ROPE OR CABLE SECURING DEVICE

(76) Inventor: Clyde Hillier, 438 Ridout St., London, Ontario (CA), N6C 4A1

( * ) Notice: Subject to any disclaimer, the term of this patent is extended or adjusted under 35 U.S.C. 154(b) by 0 days.

(21) Appl. No.: 10/365,387

(22) Filed: Feb. 13, 2003

(65) Prior Publication Data
US 2003/0177973 A1 Sep. 25, 2003

Related U.S. Application Data
(60) Provisional application No. 60/355,819, filed on Feb. 13, 2002.

(51) Int. Cl.[7] ............................................. B63G 21/04
(52) U.S. Cl. ................... 114/230.2; 114/218; 24/115 G
(58) Field of Search ............................... 114/218, 230.2; 410/101; 211/119.01; 104/209; 254/408; 24/115 G

(56) References Cited

U.S. PATENT DOCUMENTS

| | | | |
|---|---|---|---|
| 1,493,490 A | 5/1924 | Holzapfel | |
| 2,881,498 A | 4/1959 | Valentine, Jr. et al. | |
| RE27,986 E | 4/1974 | Jensen | |
| 4,506,417 A | 3/1985 | Hara | |
| 4,811,466 A | 3/1989 | Zubli | |
| 4,878,269 A | 11/1989 | Anscher et al. | |
| 5,263,232 A | 11/1993 | Matoba | |
| 5,301,627 A | * 4/1994 | Czipri | 114/218 |
| 5,361,461 A | 11/1994 | Anscher | |
| 5,548,873 A | 8/1996 | Macias | |
| 5,671,505 A | 9/1997 | Anscher | |
| 5,737,808 A | 4/1998 | Ikeda | |
| 6,018,851 A | 2/2000 | Anscher | |
| 6,038,746 A | 3/2000 | Anscher et al. | |

* cited by examiner

Primary Examiner—Ed Swineheart
(74) Attorney, Agent, or Firm—Anissimoff & Assoc.; Hans Koenig

(57) ABSTRACT

A device for securing a rope or cable that may be easily mounted to an object or supporting structure. The device includes a base having a socket for receiving a plunger. A coil spring is located at the bottom of the socket and exerts an upward bias against the bottom of the plunger. Both the upper portion of the base and the plunger have circular apertures that may be selectively vertically aligned by depressing the plunger to permit horizontal passage of a rope through the aligned apertures. By releasing the plunger, a shearing force is applied to the rope due to the misalignment of the apertures, thereby frictionally securing the rope or cable within the device. A foot operated mechanism may be employed to assist the user in depressing the plunger. The plunger may also be selectively and/or releasably locked in a depressed position to maintain alignment of the apertures, facilitating insertion of the rope without the need for maintaining a downward force on the plunger.

20 Claims, 5 Drawing Sheets

ROPE OR CABLE SECURING DEVICE

This application claims the benefit of U.S. provisional patent application No. 60/355,819 filed on Feb. 13, 2002.

FIELD OF THE INVENTION

The present invention relates to devices used to secure a rope or cable. Specifically, the invention relates to devices that exert a shearing force on the rope or cable to thereby frictionally secure the rope or cable within the device and prevent unintentional removal of the rope or cable.

BACKGROUND OF THE INVENTION

In order to secure an object using a rope or cable, hereinafter "the rope", the rope is normally attached at one end to the object and at the other end to a fixed support structure. The rope is normally attached by means of tying. A suitable location for tying the rope must be provided on both the object and the support structure. For example, an eyelet may be provided for insertion of the rope through the eyelet followed by tying of the rope to thereby secure the rope. Alternatively, a cleat may be provided for wrapping of the rope around the cleat followed by tying of the rope to thereby secure the rope.

A rope is typically used in this manner, for example, in the securing of boats to docks or similar support structures. In certain situations, such as during inclement weather conditions, it may be difficult to tie the rope as previously described. Also, if further tensioning of the rope is required to secure the boat against the dock, the rope must be untied, necessitating bending into an awkward position wherein it may not be possible to prevent the briefly unsecured boat from escaping from the dock. Moreover, many people do not know how to properly tie knots or do not wish to tie knots. Accordingly, there is a need for a device for easily securing a rope that may be mounted to an object or support structure, thereby eliminating the necessity of knot tying.

Cord locking devices are known in the prior art. One example of a general type includes a pair of telescoping members, each having apertures that may be aligned for insertion of the cord therethrough in a direction perpendicular to the telescoping axis. A spring biasing means is also typically included for urging the telescoping members apart, thereby misaligning the apertures and exerting a shearing force against the cord. The cord is thereby frictionally secured within the apparatus by means of the shearing force, preventing the removal of the cord by tension.

The prior art devices are typically quite small and are designed for light-weight cords with spring biasing means that typically may be overcome by simple finger pressure in order. To secure a rope of a type suitable for attaching a boat to a dock, the spring biasing means must exert a much greater shearing force than is provided in the prior art devices. Also, the prior art devices lack mechanisms for applying the large amount of force required to overcome a powerful spring biasing means, such as mechanisms employing body weight and/or leverage. The prior art devices are not suitably designed for mounting to an object or supporting structure.

The need therefore exists for an improved rope or cable securing device to overcome the disadvantages of the prior art.

SUMMARY OF THE INVENTION

According to the present invention, there is provided an apparatus for securing a rope to a structure, the apparatus comprising: a base having integrally formed mounting lugs for mounting the base to a structure, the base further having an upright portion with a socket having a bottom, an open top, and a first pair of opposed interior recesses, the upright portion further having a front face and a rear face, each face having a first aperture therethrough, the first apertures concentrically aligned with one another; a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures; and, a biasing means mounted within the socket at the bottom thereof and engaged with the plunger to upwardly bias the plunger and normally misalign the first and second apertures.

According to another aspect of the invention, there is provided an apparatus for securing a rope to a structure, the apparatus comprising: a base having integrally formed mounting lugs for mounting the base to a structure, the base further having an upright portion with a socket having a bottom, an open top, and a pair of opposed interior recesses, the upright portion further having a front face and a rear face, each face having a first aperture therethrough, the first apertures concentrically aligned with one another; a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures by depressing the plunger using a foot operated means; and, a biasing means mounted within the socket at the bottom thereof and engaged with the plunger to upwardly bias the plunger and normally misalign the first and second apertures.

According to yet another embodiment of the present invention, there is provided an apparatus for securing a rope to a structure, the apparatus comprising: a base having integrally formed mounting lugs for mounting the base to a structure, the base further having an upright portion with a socket having a bottom, an open top, and a pair of opposed interior recesses, the upright portion further having a front face and a rear face, each face having a first aperture therethrough, the first apertures concentrically aligned with one another; a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures by depressing the plunger using a foot operated means to a depressed position, the plunger lockable by a locking means in the depressed position to maintain alignment of the second and first apertures; and, a biasing means mounted within the socket at the bottom thereof and engaged with the plunger to upwardly bias the plunger and normally misalign the first and second apertures.

The device has application in, for example, securing of boats to docks, securing of airplanes to the ground, and securing of articles to vehicles.

Further features of the invention will be described or will become apparent in the course of the following detailed description.

BRIEF DESCRIPTION OF THE DRAWINGS

In order that the invention may be more clearly understood, preferred embodiments thereof will now be described in detail by way of example, with reference to the accompanying drawings, in which.

PREFERRED EMBODIMENT

Figure 1:
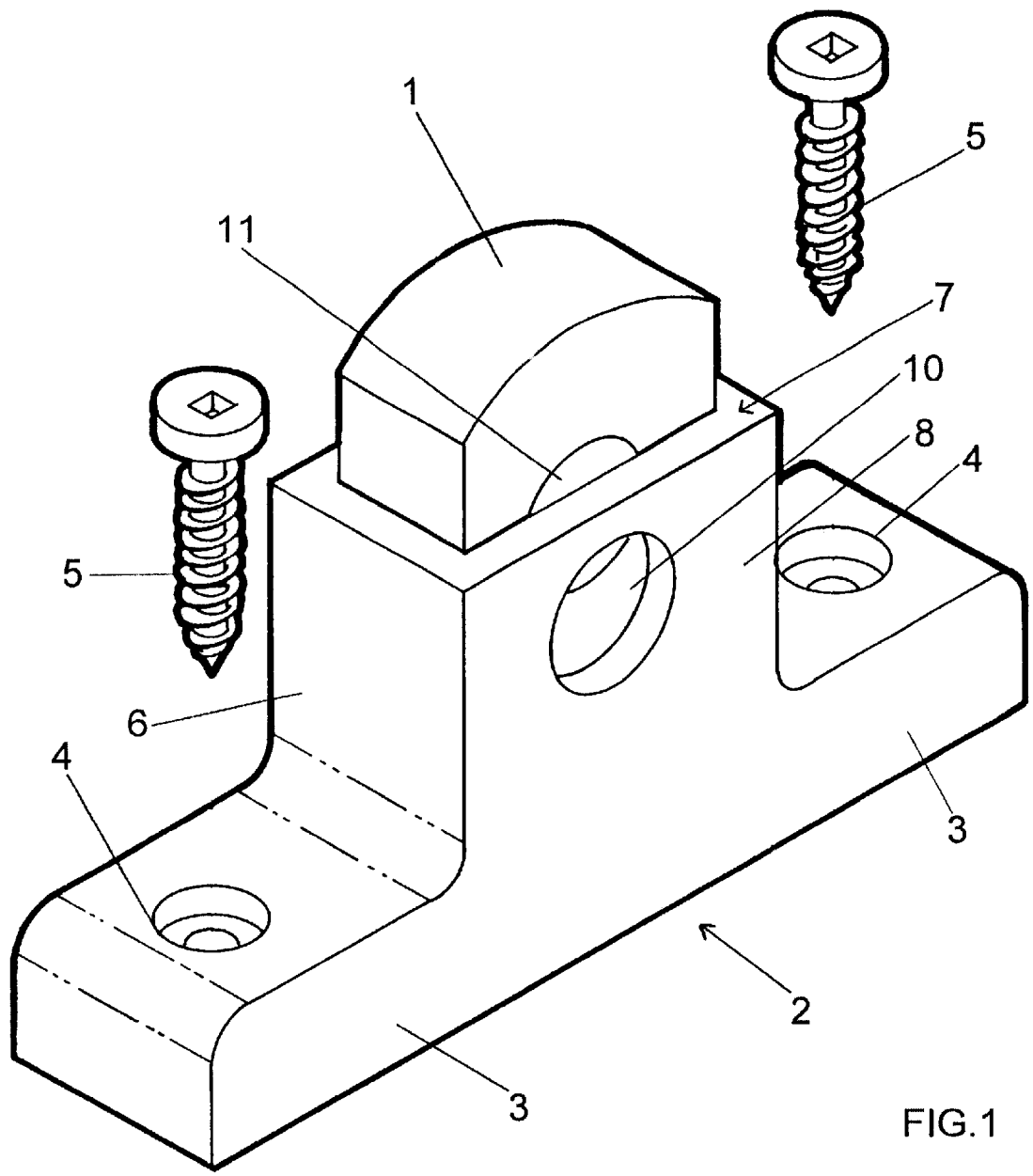
FIG. 1 is a perspective view of an embodiment of a rope or cable securing device.

Referring to FIG. 1, a rope or cable securing device is shown in perspective view. The device comprises a plunger 1 and base 2. The base 2 includes integrally formed mounting lugs 3 for mounting of the rope or cable securing device to an object or supporting structure, such as, for example, a dock. The mounting lugs 3 include mounting holes 4 for vertical insertion of mounting screws 5 therethrough. If the dock is made from a suitable material, such as wood, the mounting screws 5 are used to attach the rope or cable securing device to the dock. Alternatively, a mounting plate (not shown) may be attached to the dock and the rope or cable securing device attached to the mounting plate using suitable means, for example, screws, bolts, or welds.

The plunger 1 has a substantially rectangular horizontal cross section. The base 2 includes an upright portion 6 with a substantially rectangular horizontal cross section. The upright portion 6 includes a concentric rectangular socket 7 with an open top. The plunger 1 is inserted into the socket 7 and is vertically translatable within the socket. The upright portion 6 has a front face 8 and rear face (not shown), each face having a circular aperture 10 passing horizontally therethrough to the interior of the socket 7, the apertures concentrically aligned with one another. The plunger 1 has a similar circular aperture 11 passing horizontally therethrough. When the plunger 1 is inserted within the socket 7, the circular apertures 10, 11 may be selectively concentrically aligned to permit horizontal insertion of a rope through the aligned apertures.

Figure 2:
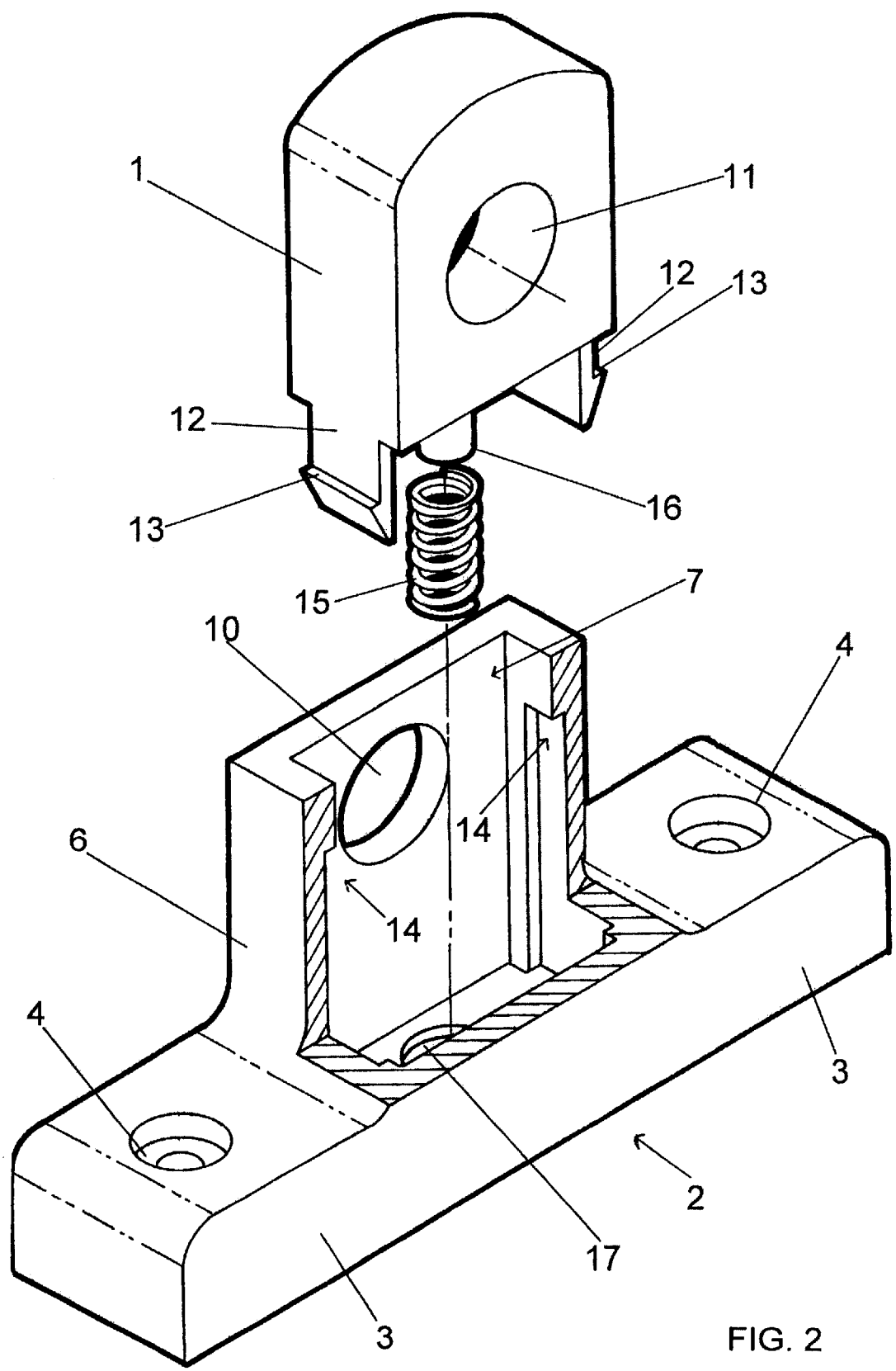
FIG. 2 is an exploded perspective view of the rope or cable securing device of FIG. 1.

Turning to FIG. 2, an exploded view of the rope or cable securing device is shown with the upright portion 6 in partial vertical cross section. The plunger 1 includes a pair of downwardly projecting resilient or flexible locking tabs 12. The lowermost portion of each locking tab 12 has a triangular shaped wedge extending outwardly and upwardly therefrom with an upper flat horizontal face 13. Upon insertion of the plunger 1 into the socket 7, the lowermost portion of each locking tab 12 is forced inwardly to permit passage of the plunger into the socket. The interior of the socket 7 has a pair of recesses 14 complementary to the locking tabs 12. Upon insertion of the triangular shaped wedge past the edge of the recess 14, the flexible locking tab 12 returns to its original position and the flat face 13 engages the uppermost portion of the recess, preventing vertical removal of the plunger 1. The plunger 1 is thereby retained within the socket 7 by means of the locking tabs 12.

A biasing means, illustrated in the Figures as coil spring 15, is upwardly oriented and retained within a circular depression 17 at the bottom of the socket 7. The bottom of the plunger 1 includes a centrally located downwardly extending cylindrical tab 16 concentric with the coil spring 15. Insertion of the plunger 1 into the socket 7 causes the cylindrical tab 16 to be received within the coil spring 15 and compresses the spring. The coil spring 15 thereby maintains an upward bias against the plunger 1, which is prevented from being expelled from the socket 7 by means of the locking tabs 12. The upward bias normally misaligns the apertures 10, 11.

By downwardly depressing plunger 1, circular apertures 10, 11 may be selectively concentrically aligned to permit horizontal passage of the rope through the device. By maintaining the alignment of the apertures, the rope is freely movable in either direction and any desired amount of tension can be applied to the rope. Releasing the plunger 1 causes the spring 15 to upwardly bias the plunger, moving the apertures into vertical misalignment. This places a shearing force on the rope, thereby frictionally securing the rope within the device and maintaining the applied rope tension. A chamfer or serration is optionally applied to the edges of the apertures 10, 11 to increase the ability of the device to hold the rope.

Figure 3:
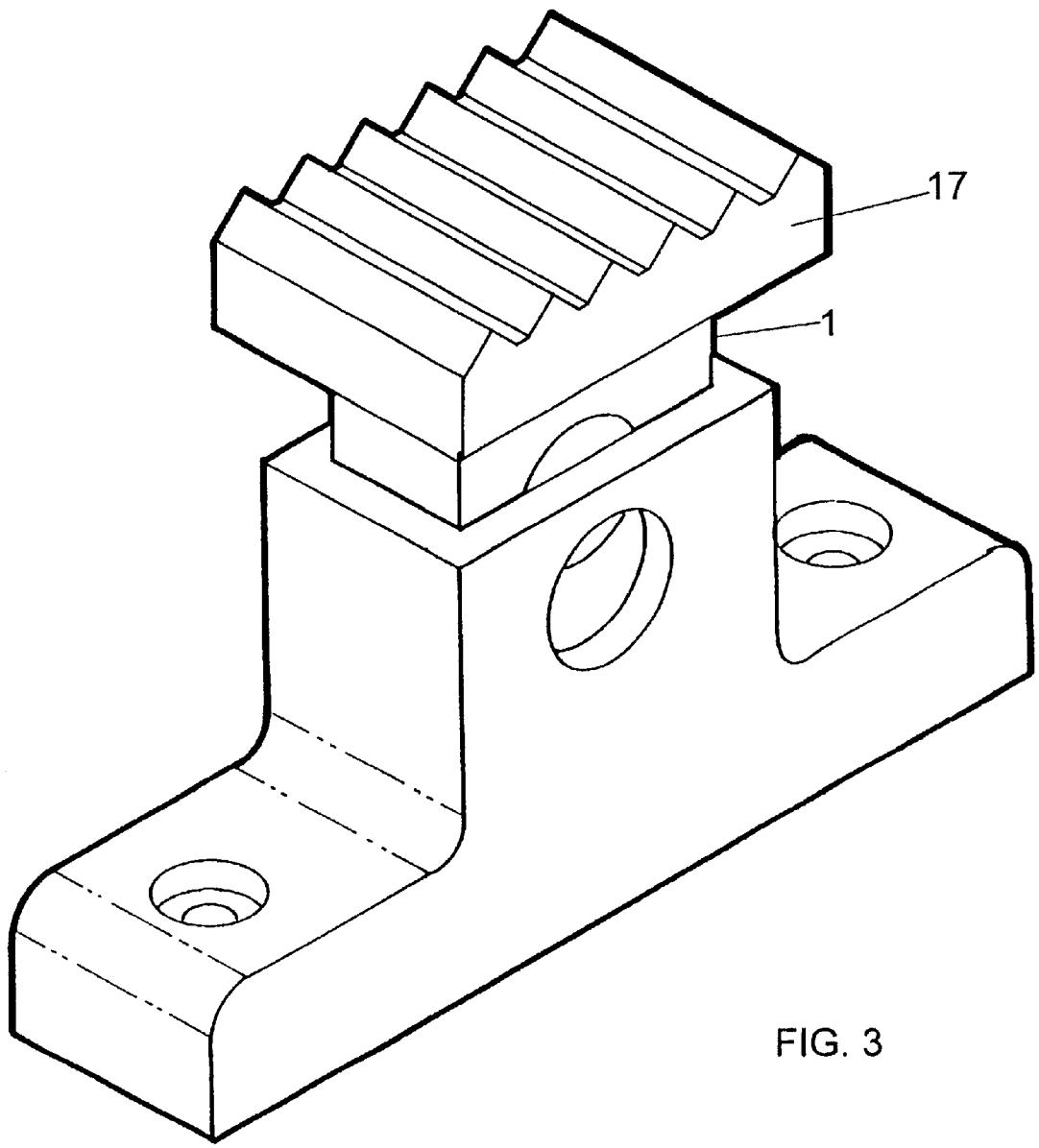
FIG. 3 is a perspective view of an embodiment of a rope or cable securing device having a foot pedal.
Figure 4:
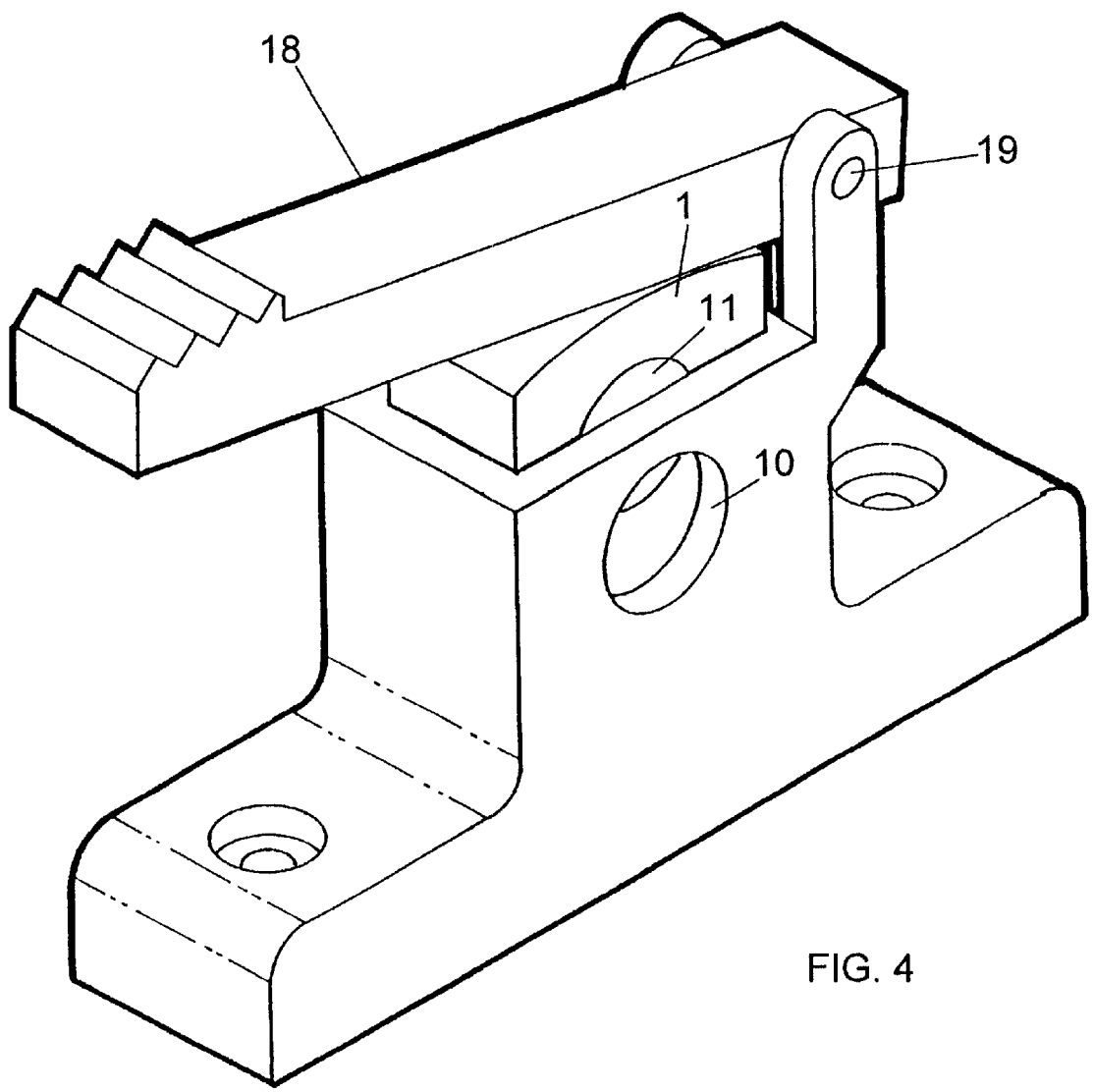
FIG. 4 is a perspective view of an embodiment of a rope or cable securing device having a foot operated mechanism; and, FIG. 5 is an exploded perspective view of an embodiment of a rope or cable securing device having a locking means.

Since a very strong spring is typically required to secure the rope from slippage due to applied tension, a large amount of force is required to depress the plunger 1. In one embodiment, shown in FIG. 3, a foot pedal 17 is added to the top of the plunger 1 to allow the user to stand on the device and apply force to the plunger with the user's body weight. In an alternative embodiment, shown in FIG. 4, a foot operated mechanism comprising a lever 18 pivotally attached to a fulcrum 19 adjacent one side of the plunger 1 employs leverage to depress the plunger. Utilizing leverage reduces the amount of force that must be applied to depress the plunger 1. Both embodiments have the added advantage of allowing the user to depress the plunger 1 with the user's foot, obviating the need for assuming an awkward, bent over position to depress the plunger. Foot operation is especially advantageous when inserting the rope through the apertures or when applying additional tension to the rope.

Figure 5:
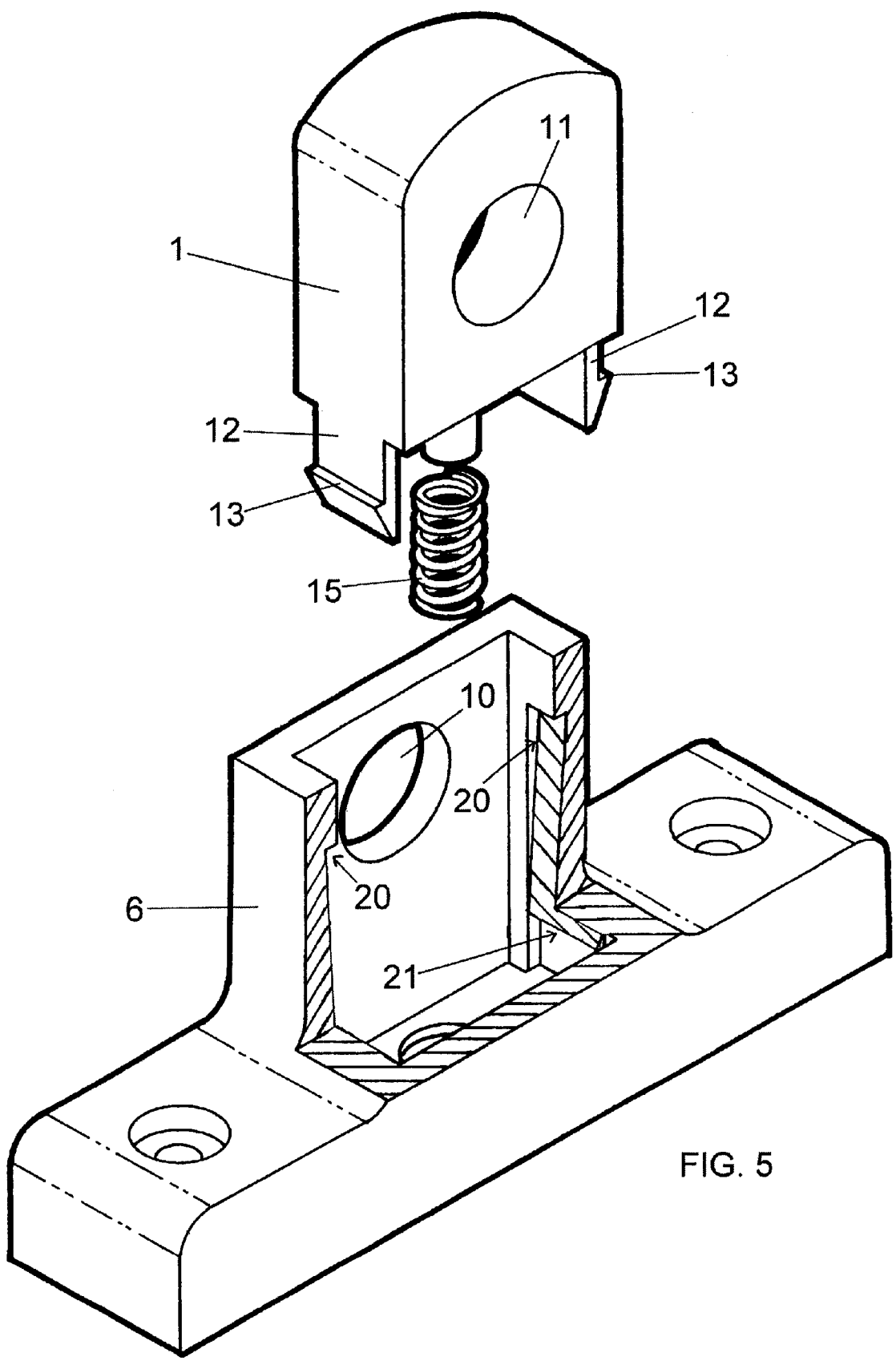

In yet another embodiment, referring to FIG. 5, the plunger 1 is selectively and/or releasably locked by a locking means in a depressed position where the apertures 10, 11 are concentrically aligned. This facilitates insertion of the rope through the apertures without the need for maintaining continuous downward pressure on the plunger 1. In this embodiment, there are two consecutive recesses used to achieve locking. A first recess 20 similar to the recess 14 previously described is provided to receive the locking tabs 12. The first recess 20 is tapered downwardly and inwardly. A second recess 21 having an uppermost portion for engagement with the triangular shaped wedge in a manner similar to the first recess 20 is provided beneath the first recess. Depressing the plunger 1 to the depressed position causes the flexible locking tabs 12 to be moved inwardly by the first recess 20 until the triangular shaped wedge clears the first recess and is received within the second recess 21. The locking tabs 12 then return to their original position and the flat face 13 engages the uppermost portion of the second recess 21, locking the plunger 1 in the depressed position wherein the circular apertures 10, 11 are concentrically aligned. A rope may then be inserted through the aligned apertures. To release the plunger 1, an opposed pair of spring loaded horizontal pins (not shown) passing through the sides of the upper portion 6 is squeezed together to engage the locking tabs 12, moving them inwardly, towards one another, and disengaging the flat face 13 from the uppermost portion of the second recess 21. The coil spring 15 then upwardly biases the plunger 1 as previously described to misalign the apertures 10, 11. Once the triangular shaped wedge has cleared the second recess 21, the pins are released and the locking tabs 12 return to their original position within the first recess 21.

The rope or cable securing device must be constructed with sufficient structural strength to withstand the applied forces of the biasing means and rope tension. This is especially necessary when securing boats during inclement weather. The device may be made from any suitable material, for example, a high impact plastic material, a reinforced plastic material, a metallic material, or a composite material. The device may be attractively finished or coloured to provide an aesthetically pleasing appearance.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for securing a rope to a structure, the apparatus comprising:
   a) a base having integrally formed mounting lugs for mounting the base to a structure, the base further having an upright portion with a socket having a bottom, an open top, and a first pair of opposed interior recesses, the upright portion further having a front face and a rear face, each face having a first aperture therethrough, the first apertures concentrically aligned with one another;
   b) a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures; and,
   c) a biasing means mounted within the socket at the bottom thereof and engaged with the plunger to upwardly bias the plunger and normally misalign the first and second apertures.

2. The apparatus of claim 1, wherein the structure is a dock and the apparatus is used for mooring a boat to the dock.

3. The apparatus of claim 1, wherein each locking tab comprises a triangular shaped wedge having an upper face for engagement with an uppermost portion of the recess.

4. The apparatus of claim 3, wherein the locking tabs are flexible.

5. The apparatus of claim 1, wherein the biasing means is a coil spring.

6. The apparatus of claim 1, wherein the second aperture is aligned with the first apertures by depressing the plunger using a foot operated means.

7. The apparatus of claim 6, wherein the foot operated means is a foot pedal on top of the plunger.

8. The apparatus of claim 6, wherein the foot operated means is a foot operated mechanism comprising a lever.

9. The apparatus of claim 1, wherein the plunger is lockable in a depressed position by a locking means, the second aperture and first apertures concentrically aligned in the depressed position.

10. The apparatus of claim 9, wherein the locking means is selectively operable.

11. The apparatus of claim 10, wherein the locking means comprises a second pair of opposed interior recesses beneath the first pair of recesses and wherein the pair of downwardly extending locking tabs is complementary to the second pair of opposed interior recesses and engaged therewith to lock the plunger in the depressed position.

12. The apparatus of claim 11, wherein the plunger is locked in the depressed position by engagement of the upper face with the uppermost portion of the second recesses.

13. The apparatus of claim 9, wherein the locking means is releasable.

14. The apparatus of claim 13, wherein the locking means comprises an opposed pair of spring loaded pins through the upright portion for engagement with the locking tabs.

15. The apparatus of claim 14, wherein the pins are squeezed together to move the locking tabs inwardly, thereby disengaging the upper face from the uppermost portion of the second recesses.

16. An apparatus for securing a rope to a structure, the apparatus comprising:
   a) a base having integrally formed mounting lugs for mounting the base to a structure, the base further having an upright portion with a socket having a bottom, an open top, and a pair of opposed interior recesses, the upright portion further having a front face and a rear face, each face having a first aperture therethrough, the first apertures concentrically aligned with one another;
   b) a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures by depressing the plunger using a foot operated means; and,
   c) a biasing means mounted within the socket at the bottom thereof and engaged with the plunger to upwardly bias the plunger and normally misalign the first and second apertures.

17. The apparatus of claim 16, wherein the foot operated means is a foot pedal on top of the plunger.

18. The apparatus of claim 16, wherein the foot operated means is a foot operated mechanism comprising a lever.

19. The apparatus of claim 16, wherein the structure is a dock and the apparatus is used for mooring a boat to the dock.

20. An apparatus for securing a rope to a structure, the apparatus comprising:
   a) a base having integrally formed mounting lugs for mounting the base to a structure, the base further having an upright portion with a socket having a bottom, an open top, and a pair of opposed interior recesses, the upright portion further having a front face and a rear face, each face having a first aperture therethrough, the first apertures concentrically aligned with one another;
   b) a plunger located within the socket, a portion of the plunger extending through the open top, the plunger translatable in the socket and having a pair of downwardly extending locking tabs complementary to the opposed recesses and engaged therewith to retain the plunger within the socket, the plunger further having a second aperture therethrough selectively concentrically aligned with the first apertures by depressing the plunger using a foot operated means to a depressed position, the plunger lockable by a locking means in the depressed position to maintain alignment of the second and first apertures; and,
   c) a biasing means mounted within the socket at the bottom thereof and engaged with the plunger to upwardly bias the plunger and normally misalign the first and second apertures.

* * * * *